United States Patent [19]

Yojima et al.

[11] Patent Number: 5,392,110
[45] Date of Patent: Feb. 21, 1995

[54] METHOD AND DEVICE FOR MEASURING HEIGHT OF OBJECT WHOSE SURFACE HAS IRREGULAR REFLECTANCE

[75] Inventors: Masayuki Yojima; Masao Kinoshita, both of Tokyo, Japan

[73] Assignee: NEC Corporation, Japan

[21] Appl. No.: 48,998

[22] Filed: Apr. 16, 1993

[30] Foreign Application Priority Data

Apr. 22, 1992 [JP] Japan .................... 4-102656

[51] Int. Cl.$^6$ .................... G01C 3/00; G01B 11/14; H01J 40/14
[52] U.S. Cl. .................... 356/1; 250/214 B; 250/214 C; 356/375; 356/376
[58] Field of Search .................... 250/214 B, 214 C; 356/1, 4, 376, 375

[56] References Cited

U.S. PATENT DOCUMENTS

| | | | |
|---|---|---|---|
| 3,679,307 | 7/1972 | Zoot et al. | 356/4 |
| 4,477,185 | 10/1984 | Berger et al. | 356/1 |
| 4,639,140 | 1/1987 | Lerat | 356/376 |
| 5,024,529 | 6/1991 | Svetkoff | 356/376 |
| 5,213,470 | 7/1993 | Koch | 356/1 |

FOREIGN PATENT DOCUMENTS 8907238 8/1989 WIPO.

Primary Examiner—Stephen C. Buczinski
Attorney, Agent, or Firm—Laff, Whitesel, Conte & Saret, Ltd.

[57] ABSTRACT

In a signal processing circuit, a height arithmetic circuit obtains a measured value of a height of an object by using the principle of triangulation from a second light receiving signal which is transmitted from a second photodetector of position detecting type thereto. An error arithmetic circuit acquires a measurement error by using the principle of triangulation from a first light receiving signal which is transmitted from a first photodetector of position detecting type thereto. A correction circuit calculates a correct height of the object by subtracting an output signal of the error arithmetic circuit from an output signal of the height arithmetic circuit.

6 Claims, 8 Drawing Sheets

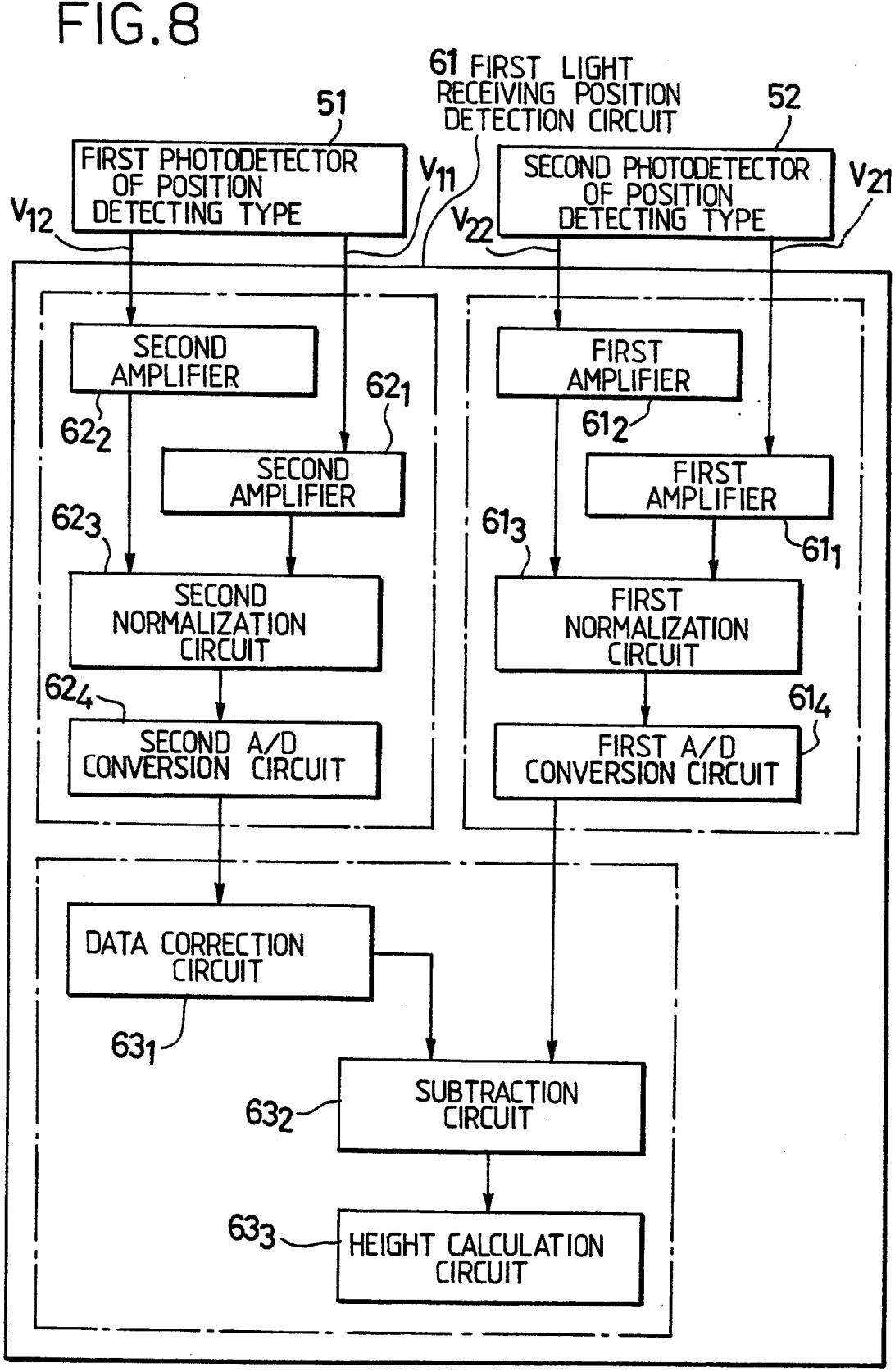

METHOD AND DEVICE FOR MEASURING HEIGHT OF OBJECT WHOSE SURFACE HAS IRREGULAR REFLECTANCE

BACKGROUND OF THE INVENTION

The present invention relates to a method and device for measuring the height of an object whose surface has irregular reflectance.

A height measuring device 100 of a conventional type concerned with the present invention comprises, as shown in FIG. 1, a measuring board 110, a floodlight optical system 120 provided in the upper part of the measuring board 110, a light receiving optical system 130 provided off to the upper left of the measuring board 110 and a signal processing circuit 140. The measuring board 110 has an XY stage which is not shown in FIG. 1. An object 101 is placed for measurement on the XY stage of the measuring board 110. The floodlight optical system 120 serves to irradiate laser light onto the surface of the object 101 and comprises a laser unit 121, a beam expander 122 composed of a plurality of lenses, a floodlight lens 123 and a reflector 124. Laser light L irradiated from the laser unit 121 is magnified into a large beam diameter by transmitting the beam expander 122, and then its beam diameter is converged by transmitting the floodlight lens 123. Laser light L transmitted the floodlight lens 123 is reflected downwardly by the reflector 124 as shown in FIG. 1 and then irradiated on the surface of the object 101 with a beam of a fixed diameter. The light receiving optical system 130 is provided for receiving a part of laser light L reflected by the surface of the object 101 (herein after referred to as "a reflected light R"), and comprises a light receiving lens 131 and a photodetector of position detecting type 132 disposed at the image forming position of the light receiving lens 131. Reflected light R is condensed by transmitting the light receiving lens 131 and then received by the photodetector of position detecting type 132. The signal processing unit 140 electrically connected to the photodetector of position detecting type 132 of the light receiving optical system 130 is used for detecting a light receiving position of reflected light R from a light receiving signal transmitted from the photodetector of position detecting type 132, and for calculating the height of the object 101 from the detected light receiving position by using the principle of triangulation.

Next, the height measurement principle of the height measuring device 100 will be described with reference to FIG. 2. It is assumed that the photodetector of position detecting type 132 is provided with its light receiving surface to which a part of laser light L reflected by the surface of the measuring board 110 (hereinafter referred to as "a reference reflected light $R_o$") inputs in perpendicular, when laser light L is vertically irradiated to the measuring board 110 without placing the object 101 thereon. Then by representing a distance between light receiving positions of reflected light R and reference reflected light $R_o$ in the photodetector of position detecting type 132 as "d," an angle between the optical axes of laser light L and the light receiving lens 131 as "$\theta$", and a scale factor of the light receiving lens 131 as "m," the height of the object 101 placed on the measuring board 110 is given by the following expression.

$$h = d/(m \times \sin(\theta)) \qquad (1)$$

Since the light receiving position of reference reflected light $R_o$ is known beforehand, the height of the object 101 can be obtained by detecting the light receiving position of reflected light R in the photodetector of position detecting type 132 by means of the signal processing circuit 140.

However, with the height measuring method of the conventional height measuring device 100 of this type, there occurs a problem such as shown in FIG. 3. That is, when the reflectance of surface S of the object 101 is uniform, the intensity centroid and the beam center of reflected light R coincide, so that the light receiving position $Q_1$ of reflected light R in the photodetector of position detecting type 132 can be obtained from the position of the intensity centroid of reflected light R in the photodetector. On the other hand, when the reflectance of surface S of the object 101 is not uniform, the intensity centroid and the beam center of reflected light R do not coincide. Therefore, when the light receiving position of reflected light R in the photodetector of position detecting type 132 is obtained from the position of the intensity centroid of reflected light R in the photodetector, the light receiving position thus obtained is displaced in proportion to a displacement between the intensity centroid and the beam center of reflected light R, for example, as shown in FIG. 3 by light receiving positions $Q_2$ and $Q_3$. To be concrete, when a beam diameter of laser light L is represented by "D," an angle between the beam center line of laser light L and the optical axis of the light receiving lens 131 by "$\theta_1$" (herein after referred to as "a light receiving angle"), and further when the position of the intensity centroid of reflected light R in the photodetector of position detecting type 132 deviates from the position of the beam center of same reflected light R by utmost D/2, measurement error $\Delta h$ given by the following expression is generated.

$$\Delta h = D/(2 \times \tan(\theta_1)) \qquad (2)$$

For example, when laser light L has beam diameter D=20 $\mu$m, light receiving angle $\theta_1 = 30°$, then measurement error $\Delta h = 17.3$ $\mu$m. In addition to the above, as factors causing measurement error $\Delta h$, there are other factors such as fluctuation of the outgoing angle of the laser 121 or the displacement of an incident beam itself due to deviation of a scanning surface of a scanner used for scanning of laser light L in a scanning system.

In these circumstances, since height h of the object 101 is obtained with the conventional height measurement device 100 by assuming the position of the intensity centroid of reflected light R as the light receiving position of reflected light R in the photodetector of position detecting type 132, there occurs a problem that a measurement error $\Delta h$ is included in height h thus obtained due to such as the unevenness of the reflectance of surface S of the object 101 or the displacement of the incident beam.

SUMMARY OF THE INVENTION

An object of the present invention is to provide a method and device capable of measuring the correct height of an object even when the reflectance of the surface of the object is not uniform.

Other objects of the present invention will become obvious from the following description.

In accordance with an aspect of the present invention, there is provided a method of height measurement which comprises; a first step of irradiating laser light to a surface of an object, a second step of calculating a measurement error, which is included in a measured value of the height of the object, from a first reflected light reflected from the surface of the object toward an incident direction of the irradiated laser light, a third step of obtaining the measured value from a second reflected light reflected from the surface of the object to a direction different from the incident direction of the irradiated laser light, and a fourth step of correcting the measured values by using the measurement error.

In accordance with an aspect of the present invention, there is provided a height measuring device which comprises; a measuring board on which an object is placed, floodlight optical means for irradiating laser light to the surface of the object with a beam of a given diameter, first light condensing means for condensing a first reflected light reflected from the surface of the object toward an incident direction of the irradiated laser light, a first photodetection means, which is provided at the image forming position of the first condensing means, for detecting a first displacement of the intensity centroid of the first reflected light from the beam center thereof, second light condensing means for condensing a second reflected light reflected from the surface of the object toward a direction different from the incident direction of the irradiated laser light, a second photodetection means, which is provided at the image forming position of the second condensing means, for detecting a second displacement of the intensity centroid of the second reflected light from the beam center thereof, height arithmetic means for calculating a measured value of the height of the object according to a principle of triangulation by using the second displacement detected by the second photodetection means, measurement error arithmetic means for calculating a measurement error according to the principle of triangulation by using the first displacement detected by the first photodetection means, and correction means for correcting the measured value obtained by the height arithmetic means by using the measurement error calculated by the measurement error arithmetic means.

BRIEF DESCRIPTION OF THE DRAWINGS

The features and advantages of the present invention will become apparent from the following description when taken in conjunction with the accompanying drawings in which:

FIG. 8 is a block diagram showing a signal processing circuit to be used for a height measuring device of a second embodiment of the present invention.

DESCRIPTION OF THE PREFERRED EMBODIMENTS

Figure 1:
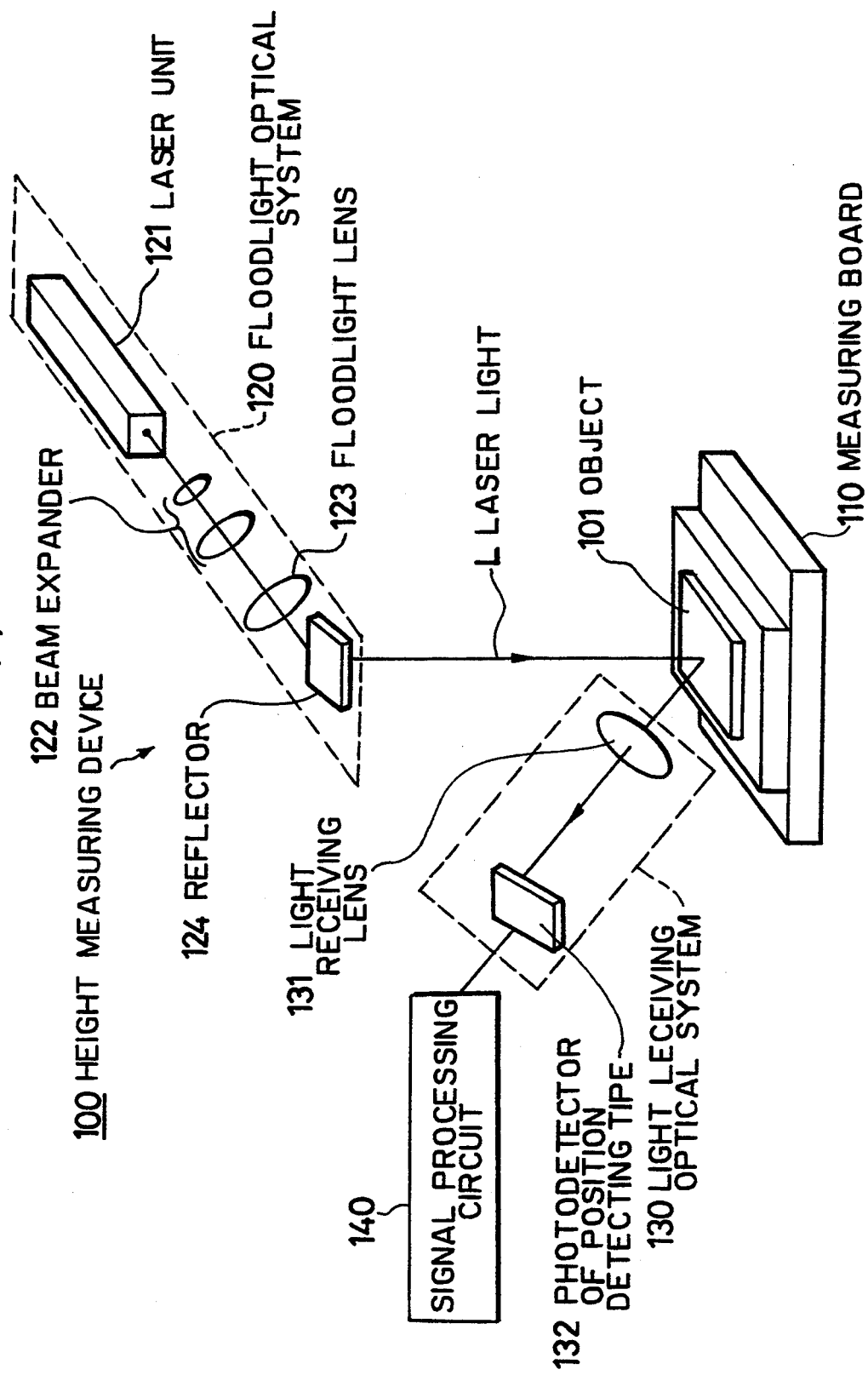
FIG. 1 is a perspective view showing a height measuring device of a conventional type concerned with the present invention.
Figure 2:
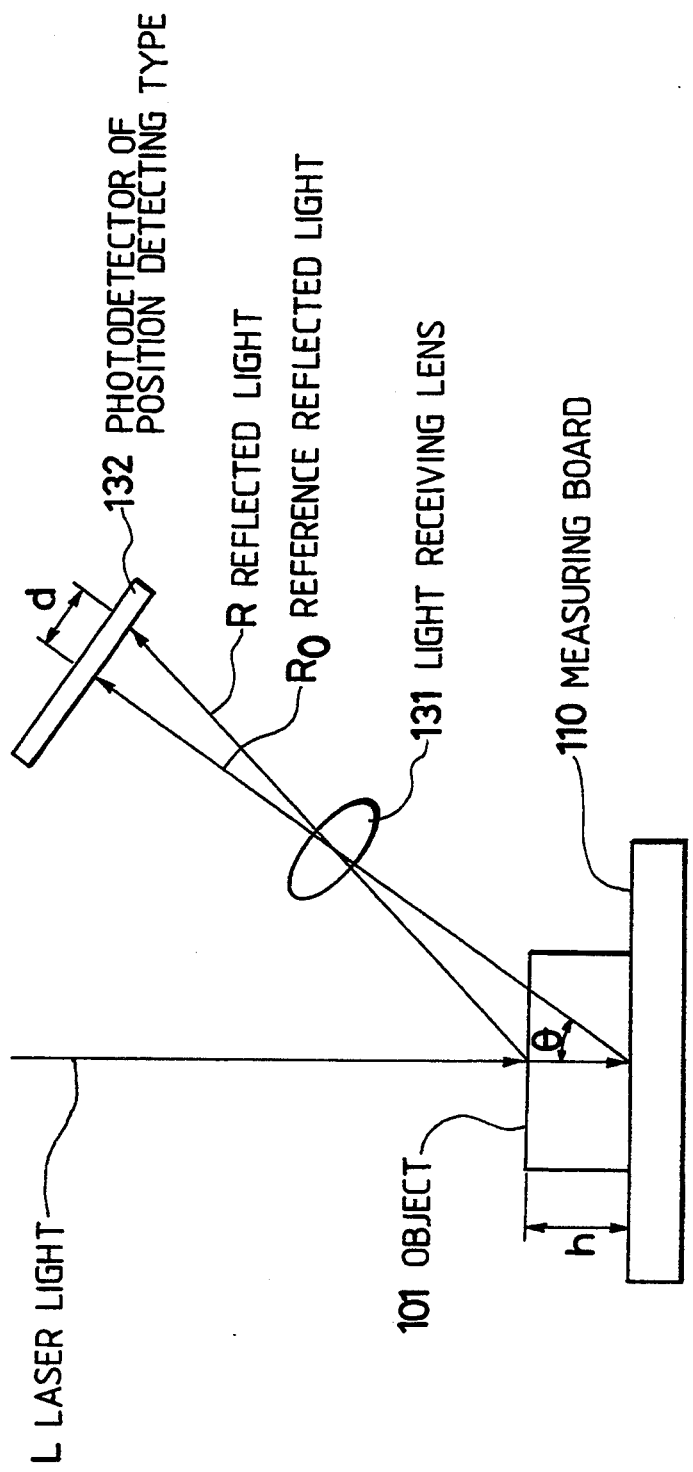
FIG. 2 is a view explaining the height measuring principle of the conventional height measuring device shown in FIG. 1.
Figure 3:
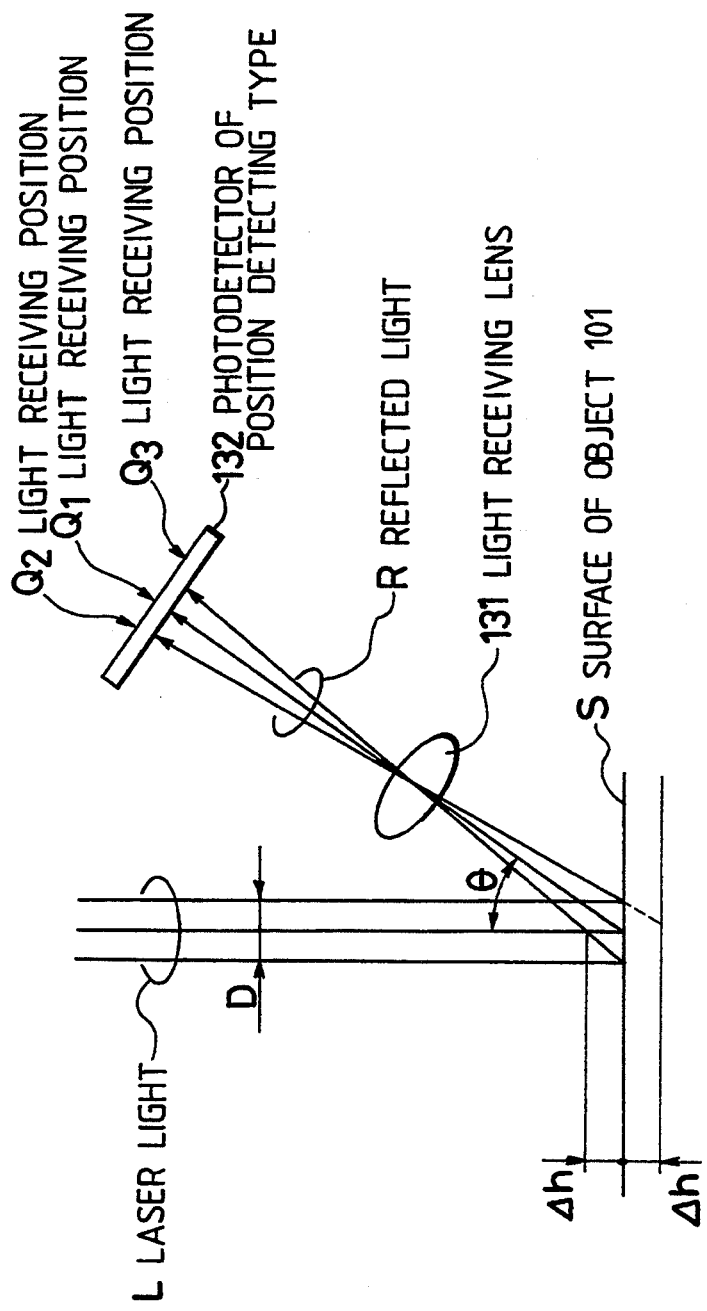
FIG. 3 is a view explaining a problem of the conventional height measuring device shown in FIG. 1.
Figure 4:
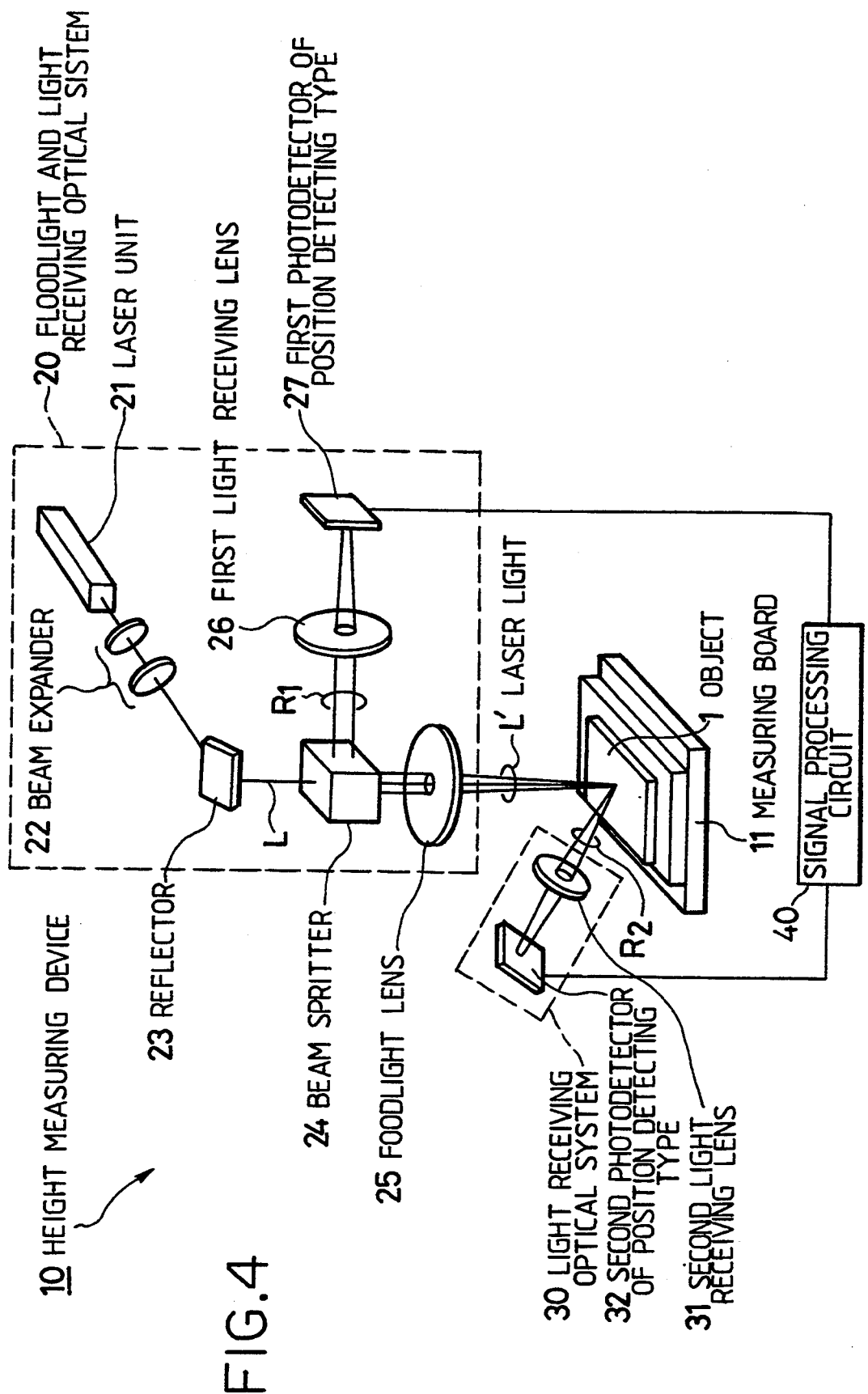
FIG. 4 is a perspective view showing a height measuring device of a first embodiment of the present invention.

A height measuring device 10 of a first embodiment of the present invention comprises, as shown in FIG. 4, a measuring board 11, a floodlight and light receiving optical system 20 provided in the upper part of the measuring board 11, a light receiving optical system 30 provided diagonally to the upper left of the measuring board 11 and a signal processing circuit 40. The measuring board 11 has an XY stage which is not shown in FIG. 4. An object 1 is placed on the XY stage of the measuring board 11.

The floodlight and light receiving optical system 20 comprises a laser unit 21, a beam expander 22 composed of a plurality of lenses, a reflector 23, a beam splitter 24, a floodlight lens 25, a first light receiving lens 26, and a first photodetector of position detecting type 27 provided at the image forming position of the first light receiving lens 26. Laser light L irradiated from the laser unit 21 is magnified into a large beam diameter by transmitting the beam expander 22 and then reflected downwardly by the reflector 23 as shown in FIG. 4. Laser light L reflected by the reflector 23 goes into the beam splitter 24, in which it is divided into laser light L' which transmits the beam splitter 24 straightly and the laser light reflected by the beam splitter 24 to an opposite side of the first light receiving lens 26 therethrough. Laser light L' transmitted the beam splitter 24 straightly is converged into a small beam diameter by transmitting the floodlight lens 25, and then it is irradiated with a fixed beam diameter on the surface of the object 1. A part of laser light L' upwardly reflected in FIG. 4 by the surface of the object 1 goes through the floodlight lens 25 and goes into the beam splitter 24 to be divided into the laser light which transmits the beam splitter 24 straightly and the laser light which is reflected by the beam splitter 24 to the opposite side of the first light receiving lens 26 (hereinafter referred to as "a first reflected light $R_1$"). First reflected light $R_1$ is condensed by the first light receiving lens 26 and then received by the first photodetector of position detecting type 27. Here, the first photodetector of position detecting type 27 is provided in such a way that the beam center line of a reflected light of laser light. L' which is reflected from the measuring board 11 without the object 1, coincides with the center of the light receiving surface of the first photodetector of position detecting type 27.

Figure 5:
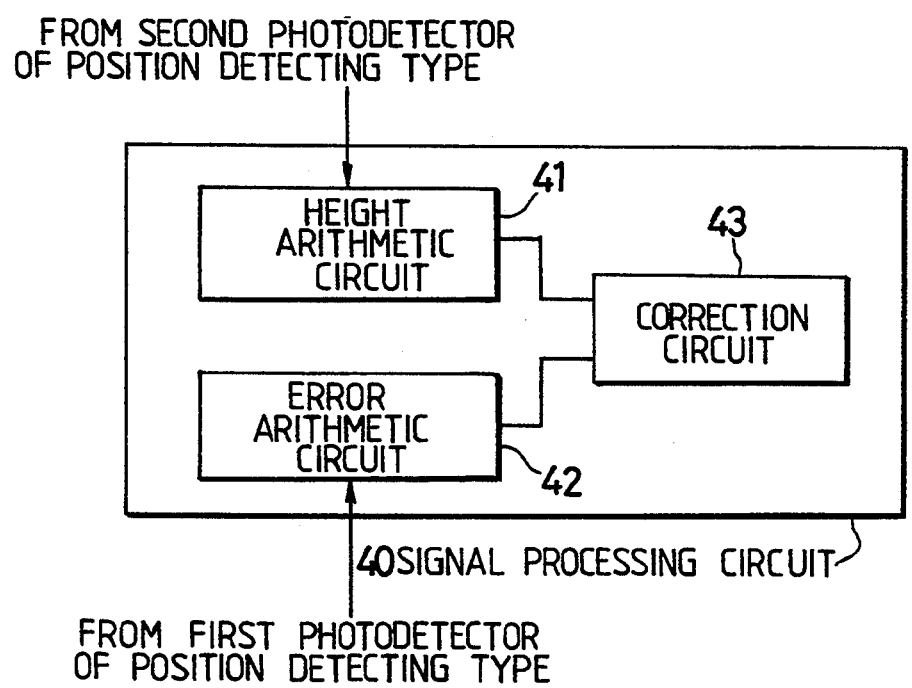
FIG. 5 is a block diagram showing a signal processing circuit shown in FIG. 4.

The light receiving optical system 30 comprises a second light receiving lens 31 and a second photodetector of position detecting type 32 provided at the image forming position of the second light receiving lens 31. A part of laser light reflected by the surface of the object 1 off to the upper left in FIG. 4 (hereinafter referred to as "a second reflected light $R_2$") is condensed by transmitting the second light receiving lens 31, and then received by the second photodetector of position detecting type 32. The second photodetector of position detecting type 32 is provided in such a way that the beam center line of the reflected light from the measuring board 11 when laser light L' is directly irradiated to the measuring board 11, coincides with the center of the light receiving surface of the second photodetector of position detecting type 32. The signal processing circuit 40, which is electrically connected to the first photodetector of position detecting type 27 and the second photodetector of position detecting type 32 respectively, is employed for calculating the height of the object 1 by using the first light receiving signal transmitted from the first photodetector of position detecting type 27 and the second light receiving signal transmitted from the second photodetector of position detecting type 32. The signal processing circuit 40 comprises, as shown in FIG. 5, a height arithmetic circuit 41 electrically connected to the second photodetector of position detecting type 32, an error arithmetic circuit 42 electrically connected to the first photodetector of position detecting type 27, and a correction circuit 43 electrically connected to the height arithmetic circuit 41 and the error arithmetic circuit 42 respectively. The height arithmetic circuit 41 is used for obtaining measured value $h_1$ of the height of the object 1 by using the second light receiving signal which is transmitted from the second photodetector of position detecting type 32 thereto. The error arithmetic circuit 42 is used for calculating measurement error $\Delta h_1$ caused by the unevenness of the surface reflectance of the object 1 by using the first light receiving signal which is transmitted from the first photodetector of position detecting type 27 thereto. The correction circuit 43 is prepared for performing the subtraction of measured value $h_1$ which is transmitted from the height arithmetic circuit 41 thereto and measurement error $\Delta h_1$ which is transmitted from the error arithmetic circuit 42 thereto, and for obtaining correct height h of the object 1 in which measurement error $\Delta h_1$ is removed.

In other words, in the height arithmetic circuit 41, the light receiving position of second reflected light $R_2$ in the second photodetector of position detecting type 32 is detected from the second light receiving signal which is transmitted from the second photodetector of position detecting type 32 thereto. This light receiving position coincides with the position of the intensity centroid of second reflected light $R_2$ in the second photodetector of position detecting type 32. Therefore, displacement $d_1$ of the detected light receiving position from the center of the light receiving surface of the second photodetector of position detecting type 32 is obtained. When displacement $d_1$ is obtained, measured value $h_1$ is given by the following expression.

$$h_1 = d_1/(m_1 \times \sin(\theta_1)) \qquad (3)$$

$m_1$ represents the image formation scale factor of the second light receiving lens 31.

$\theta_1$ represents the light receiving angle of the second photodetector of position detecting type.

In the error arithmetic circuit 42, the light receiving position of first reflected light $R_2$ in the first photodetector of position detecting type 27 is detected from the light receiving signal which is transmitted from the first photodetector of position detecting type 27 thereto. This light receiving position coincides with the position of the intensity centroid of first reflected light $R_1$ in the first photodetector of position detecting type 27. Therefore, displacement $d_2$ of the detected light receiving position from the center of the light receiving surface of the first photodetector of position detecting type 27 is obtained. When displacement $d_2$ is obtained, measurement error $\Delta h_1$ caused by the irregularity of the surface reflectance of the object 1 is given by the following expression.

$$\Delta h_1 = d_2 \times f_2/f_1 \times \tan(\theta_1) \qquad (4)$$

$f_1$ represents the focal distance of the floodlight lens 25.

$f_2$ represents the focal distance of the first light receiving lens 26.

In the correction circuit 43, by using measured value $h_1$ which is obtained by the height arithmetic circuit 41 and measurement error $\Delta h_1$ which is obtained by the error arithmetic circuit 42, correct height h of the object 1 in which measurement error $\Delta h_1$ is removed is calculated by the following expression.

$$h = h_1 - \Delta h_1 \qquad (5)$$

Figure 6:
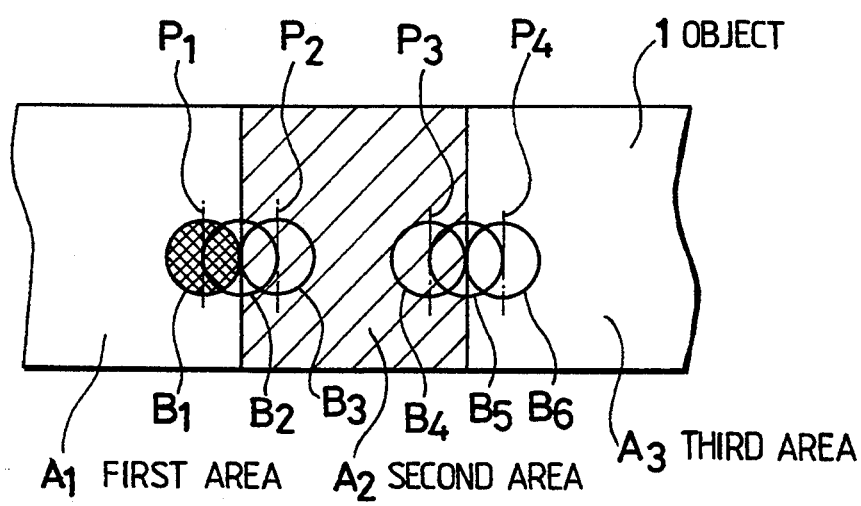
FIG. 6 is a plan of an object for explaining the function of the height measuring device shown in FIG. 1.

Next, as shown in FIG. 6, by exemplifying the height measurement of the object 1 which has a surface divided into first area $A_1$ with large reflectance, second area $A_2$ with small reflectance and third area $A_3$ with large reflectance along the scanning direction of the laser light (in FIG. 6, from left to right), the detailed description will be made with reference to the possibility of executing the correct measurement of the height of the object 1 by using the height measuring device 10.

Since laser light L' to be irradiated to the surface of the object 1 has a beam of a limited diameter, when the irradiation area of laser light L' is within first area $A_1$ as first irradiation area $B_1$, in other words, when the scanning position of laser light L' (the position of the beam center of laser light L') is in the left side further than first scanning position $P_1$ in FIG. 6, the intensity centroid and the beam center of second reflected light $R_2$ coincide with each other, so that measured value $h_1$ obtained by the height arithmetic circuit 41 gives the correct height of the object 1. Further, the intensity centroid and the beam center of first reflected light $R_1$ also coincide, that is, the intensity centroid of first reflected light $R_1$ coincides with the center of the light receiving surface in the first photodetector of position detecting type 27, and thus measurement error $\Delta h_1$ obtained by the error arithmetic circuit 42 becomes "0." Therefore, correct height h of the object 1 can also be obtained by subtracting measurement error $\Delta h_1$ from measured value $h_1$ in the correction circuit 43.

Figure 7A:
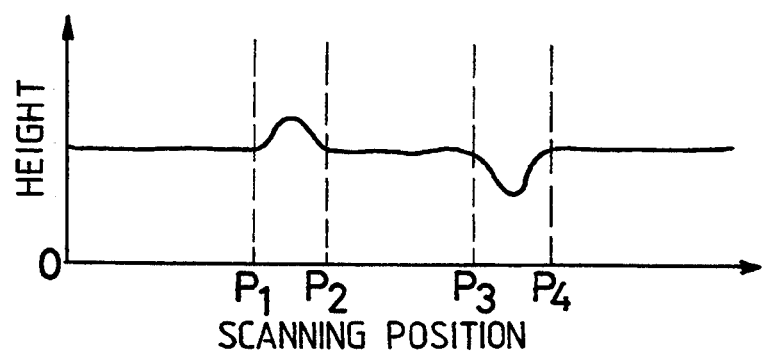
FIG. 7A is a view showing an output signal of a first height arithmetic circuit.
Figure 7B:
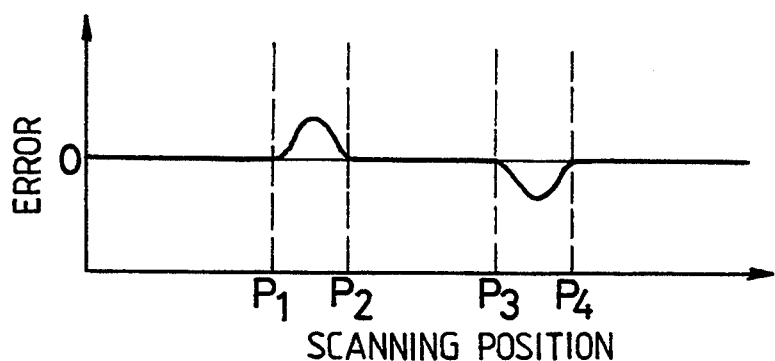
FIG. 7B is a view showing an output signal of a second height arithmetic circuit.
Figure 7C:
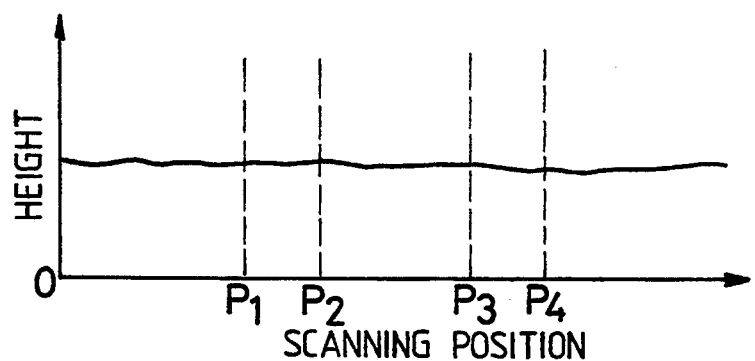
FIG. 7C is a view showing an output signal of a third height arithmetic circuit.

When the irradiation area of laser light L' extends over first area $A_1$ and second area $A_2$ as second irradiation area $B_2$, in other words, when the scanning position of laser light L' is between first scanning position $P_1$ and second scanning position $P_2$, the intensity centroid of second reflected light $R_2$ deviates from the beam center thereof, so that measured value $h_1$ obtained by the height arithmetic circuit 41 gives a height higher than the correct height of the object 1 including a measurement error due to the unevenness of the surface reflectance of the object 1, as shown in FIG. 7A. Further, since the intensity centroid of first reflected light $R_1$ also deviates from the beam center thereof, measurement error $\Delta h_1$ obtained by the error arithmetic circuit 42 becomes positive as shown in FIG. 7B. Therefore, correct height h of the object 1 can be obtained by subtracting measurement error $\Delta h_1$ from measured value $h_1$ in the correction circuit 43 as shown in FIG. 7C.

When the irradiation area of laser light L' is within second area $A_2$ as third irradiation area $B_3$ and fourth irradiation area $B_4$, in other words, when the scanning position of laser light L' is between second scanning position $P_2$ and third scanning position $P_3$, the intensity centroid and the beam center of second reflected light $R_2$ coincide with each other, so that measured value $h_1$ obtained by the height arithmetic circuit 41 gives the correct height of the object 1. Further, since the intensity centroid and the beam center of first reflected light $R_1$ also coincide, measurement error $\Delta h_1$ obtained by the error arithmetic circuit 42 becomes "0." Therefore, correct height h of the object 1 can also be obtained by subtracting measurement error $\Delta h_1$ from measured value $h_1$ in the correction circuit 43.

When the irradiation area of laser light L' extends over second area $A_2$ and third area $A_3$ as fifth irradiation area $B_5$, in other words, when the scanning position of laser light L' is between third scanning position $P_3$ and fourth scanning position $P_4$, the intensity centroid of second reflected light $R_2$ deviates from the beam center thereof, so that measured value $h_1$ obtained by the height arithmetic circuit 41 gives a height lower than the correct height of the object 1 including a measurement error due to the unevenness of the surface reflectance of the object 1, as shown in FIG. 7A. Further, since the intensity centroid of first reflected light $R_1$ also deviates from the beam center thereof, measurement error $\Delta h_1$ obtained by the error arithmetic circuit 42 becomes negative as shown in FIG. 7B. Therefore, correct height h of the object 1 can be obtained by subtracting measurement error $\Delta h_1$ from measured value $h_1$ in the correction circuit 43 as shown in FIG. 7C.

When the irradiation area of laser light L' is within third area $A_3$ as sixth irradiation area $B_6$, in other words, when the scanning position of laser light L' is in the right side further than fourth scanning position $P_4$ in FIG. 6, correct height h of the object 1 can be obtained in the same way as the case in which the scanning position of above laser light L' is in the left side further than first scanning position $P_1$ in FIG. 6.

In the above description, a measurement error included in measured value $h_1$ obtained by the height arithmetic circuit 41 and measurement error $\Delta h_1$ obtained by the error arithmetic circuit 42 are assumed equal. However, if they are not so, by measuring the corresponding relationship of the two beforehand and correcting measurement error $\Delta h_1$ obtained by the error arithmetic circuit 42 according to the results of measurement of the above relation, it becomes possible to obtain correct height h of the object 1.

Next, description will be made with reference to a height measuring device of a second embodiment of the present invention.

The height measuring device of the second embodiment of the present invention differs from the height measuring device 10 shown in FIG. 4 in the following points.

(1) It includes a signal processing circuit 60 shown in FIG. 8 in place of the signal processing circuit 40 shown in FIG. 5.

(2) It includes a first photodetector of position detecting type 51 which outputs two first output signals $V_{11}$, $V_{12}$, in place of the first photodetector of position detecting type 27 shown in FIG. 4. Here, values of respective first output signals $V_{11}$, $V_{12}$ are equal when the intensity centroid of first reflected light $R_1$ in the first photodetector of position detecting type 51 coincides with the center of the light receiving surface thereof, and when the intensity centroid of the first photodetector of position detecting type 51 deviates from the center of the light receiving surface thereof, one of first output signals $V_{11}$, $V_{12}$ becomes larger and correspondingly the other becomes smaller according to the distance of the above deviation.

(3) It includes a second photodetector of position detecting type 52 which outputs two second output signals $V_{21}$, $V_{22}$, in place of the second photodetector of position detecting type 32 shown in FIG. 4. Here, values of respective second output signals $V_{21}$, $V_{22}$ are equal when the intensity centroid of second reflected light $R_2$ in the second photodetector of position detecting type 52 coincides with the center of the light receiving surface thereof, and when the intensity centroid of the second photodetector of position detecting type 52 deviates from the center of the light receiving surface thereof, one of second output signals $V_{11}$, $V_{12}$ becomes larger and correspondingly the other becomes smaller according to the distance of the above deviation.

Next, the structure and operation of the signal processing circuit 60 will be described in detail.

The signal processing circuit 60 comprises a first light receiving position detection circuit 61 for detecting the light receiving position of second reflected light $R_2$ in the second photodetector of position detecting type 52, a second light receiving position detection circuit 62 for detecting the light receiving position of first reflected light $R_1$ in the first photodetector of position detecting type 51, and a height arithmetic circuit 63 for calculating correct height h of the object 1 from the output signal of the first light receiving position detection circuit 61 and the output signal of the second light receiving position detection circuit 62. The first light receiving position detection circuit 61 comprises first amplifiers $61_1$, $61_2$ which amplify second output signals $V_{21}$, $V_{22}$ transmitted from the second photodetector of position detecting type 52 respectively, the first normalization circuit $61_3$ which performs the normalization arithmetic of $(V_{21}-V_{22})/(V_{21}+V_{22})$ by using respective second output signals $V_{21}$, $V_{22}$ amplified by the first amplifiers $61_1$, $61_2$, and a first A/D conversion circuit $61_4$ which converts the output signal of the first normalization circuit $61_3$ into a digital signal. The second light receiving position detection circuit 62 comprises second amplifiers $62_1$, $62_2$ which amplify first output signals $V_{11}$, $V_{12}$ transmitted from the first photodetector of position detecting type 51 respectively, a second normalization circuit $62_3$ which performs the normalization arithmetic of $(V_{11}-V_{12})/(V_{11}+V_{12})$ by using respective first output signals $V_{11}$, $V_{12}$ amplified by the second amplifiers $62_1$, $62_2$, and a second A/D conversion circuit $62_4$ which converts the output signal of the second normalization circuit $62_3$ into a digital signal. The height arithmetic circuit 63 comprises a data correction circuit $63_1$ which corrects the output signal of the second A/D conversion circuit $62_4$, a subtraction circuit $63_2$ which performs the subtraction of the output signal of the first A/D conversion circuit $61_4$ and the output signal of the data correction circuit $63_1$, and a height calculation circuit $63_3$ which calculates correct height h of the object 1 by using the output signal of the subtraction circuit $63_2$.

In the signal processing circuit 60, respective second output signals $V_{21}$, $V_{22}$ transmitted from the second photodetector of position detecting type 52 are sent to the first normalization circuit $61_3$ for the normalization calculation after they are amplified by the first amplifiers $61_1$, $61_2$ respectively, and by finishing the above calculation, the position of the intensity centroid of second reflected light $R_2$ in the second photodetector of position detecting type 52 is obtained. Further, respective first output signals $V_{11}$, $V_{12}$ transmitted from the first photodetector of position detecting type 51 are sent to the second normalization circuit $62_3$ for the normalization calculation after they are amplified by the second amplifiers $62_1$, $62_2$ respectively, and by finishing the above calculation, the position of the intensity centroid of first reflected light $R_1$ in the first photodetector of position detecting type 51 is obtained. In the data correction circuit $63_1$, the position of the intensity centroid of first reflected light $R_1$ in the first photodetector of position detecting type 51 transmitted from the second A/D conversion circuit $62_4$ is corrected, and hence the relation between the displacement of the intensity centroid from the beam center with reference to second reflected light $R_2$ in the second photodetector of position detecting type 52 and the displacement of the intensity centroid from the beam center with reference to first reflected light $R_1$ in the first photodetector of position detecting type 51 is adjusted. Therefore, by subtracting the output signal of the data correction circuit $63_1$ from that of the first A/D conversion circuit $61_4$ in the subtraction circuit $63_2$, the position of the intensity centroid of second reflected light $R_2$ in the second photodetector of position detecting type 52 is corrected to coincide with the beam center thereof. As a result, it becomes possible to calculate the height of the object 1 in the height calculation circuit $63_3$ by using the output signal of the subtraction circuit $63_2$ and thus obtain correct height h of the object 1.

Next, description will be made with reference to a height measuring device of a third embodiment of the present invention.

The height measuring device of the third embodiment of the present invention differs from the height measuring device 10 shown in FIG. 4 in the following points.

Figure 9:
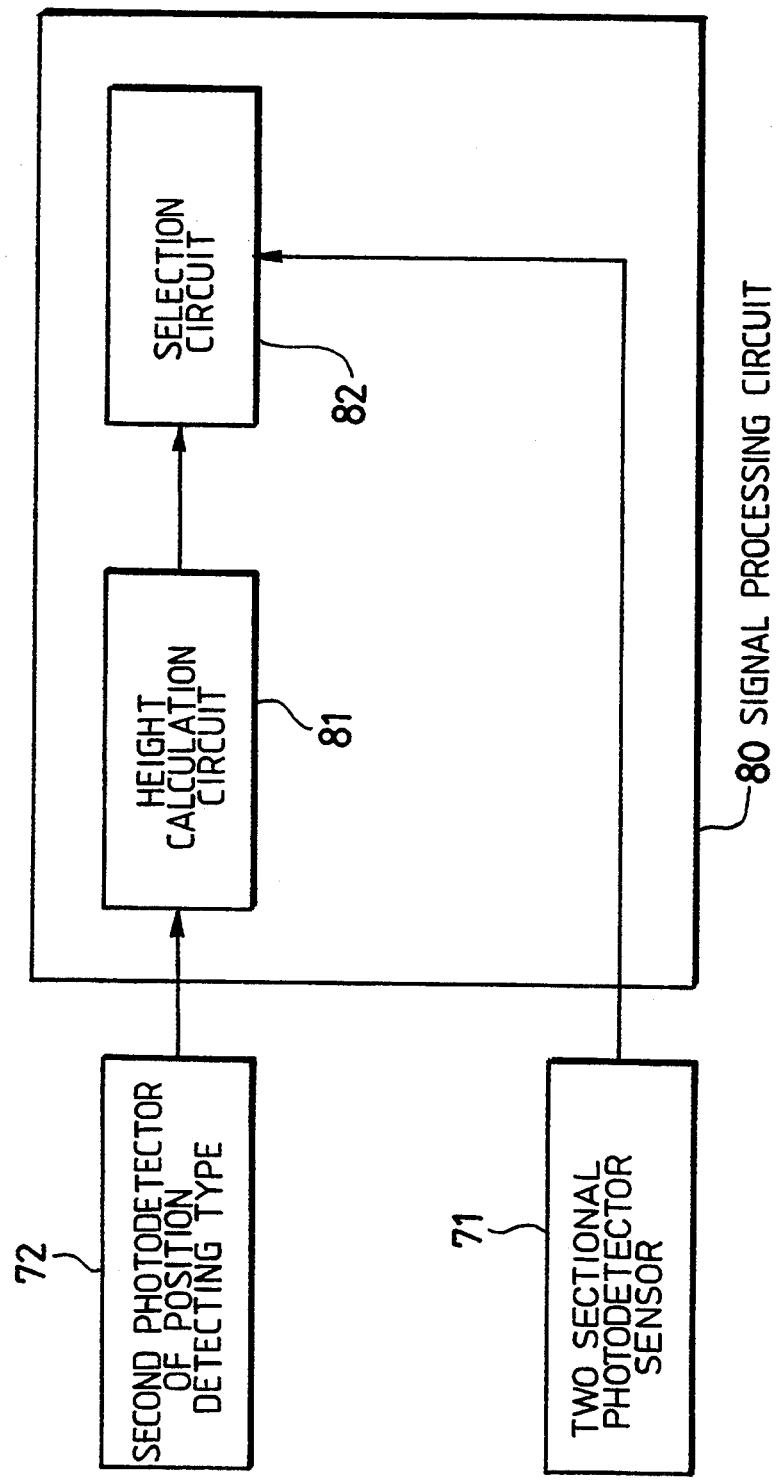
FIG. 9 is a block diagram showing a signal processing circuit to be used for a height measuring device of a third embodiment of the present invention.

(1) It includes a signal processing circuit 80 shown in FIG. 9 in place of the signal processing circuit 40 shown in FIG. 5.

(2) It includes a two sectional photodetector sensor 71 which outputs the difference between light receiving quantities of one half of a light receiving surface and the other half thereof, in place of the first photodetector of position detecting type 27 shown in FIG. 4.

Next, the structure and operation of the signal processing circuit 80 will be described in detail.

The signal processing circuit 80 comprises a height arithmetic circuit 81 for calculating the height of the object 1 by using the output of a second photodetector of position detecting type 72, and a selection circuit 82 for selecting the output signal of the height calculation circuit 81 according to the output signal of the two sectional photodetector sensor 71.

In the height arithmetic circuit 81 of the signal processing circuit 80, a measured height of the object 1 is obtained according to above expression (3) by using the output signal of the second photodetector of position detecting type 72. In the selection circuit 82, when the difference between the light receiving quantities transmitted from the two section photodetector sensor 71 is smaller than a fixed value, the displacement of the intensity centroid of first reflected light $R_l$ from the beam center thereof becomes small, and hence the measured height of the object 1 obtained by the height arithmetic circuit 81 is considered effective, thus the output signal of the height arithmetic circuit 81 is selected. On the other hand, when the difference between the light receiving quantities is larger than the fixed value, the displacement of the intensity centroid of first reflected light $R_1$ from the beam center thereof also becomes large, and hence the measured height of the object 1 obtained by the height arithmetic circuit 81 is considered to include a large measurement error caused by the unevenness of the surface reflectance of the object 1, and the output signal of the height arithmetic circuit 81 is not selected. As a result, only correct height h of measuring object 1 is outputted from the selection circuit 82.

While the present invention has been described in conjunction with the preferred embodiments thereof, it would now be possible for any person skilled in the art to readily put the present invention into practice in various other ways.

What is claimed is:

1. A method of measuring a height of a surface of an object having a non-uniform reflectivity, said method comprising:

a first step of projecting a laser beam vertically to the surface, a second step of calculating a measurement error of the surface height caused by the non-uniform reflectivity of the surface, said measurement error being calculated responsive to a first reflected light of the laser beam reflected vertically from the surface, a third step of receiving a second reflected light of the laser beam reflected from the surface in a direction which is different from the vertical direction, and calculating a measured value of the surface height responsive to the second reflected light, and a fourth step of correcting the value measured in step three by compensating the measured value for the measurement error calculated in step two.

2. A method as claimed in claim 1, wherein the second step includes steps of;

condensing the first reflected light and focusing it to form a first light spot on a light receiving surface of a first photodetector means of a position detector type, calculating a position of an intensity centroid of the first spot on the light receiving surface of the first photodetector means, and computing the measurement error in response to a deviation of the position of the intensity centroid from position of the center of the first light spot, the third step includes steps of:

condensing the second reflected light and focusing it to form a second light spot on a light receiving surface of a second photodetector means of a position detector type, calculating a position of an intensity centroid of the second light spot on the light receiving surface of the second photodetector means, and computing the measured value in response to a deviation of the position of the intensity centroid of the second light spot from a predetermined reference position corresponding to a reference height of the surface in accordance with the triangulation method.

3. A method of measuring a height of a surface of an object having a non-uniform reflectivity, said method comprising;
- a first step of projecting a laser beam vertically to the surface,
- a second step of calculating a measurement error of the surface height caused by the non-uniform reflectivity of the surface, said measurement error being calculated in response to a first reflected light of the laser beam reflected vertically from the surface,
- a third step of receiving a second reflected light of the laser beam reflected from the surface in a direction which is different from the vertical direction, and calculating a measured value of the surface height in response to the second reflected light,
- a fourth step of comparing the measurement error with a predetermined fixed value, and
- a fifth step of outputting the measured value as a surface height only when the absolute value of the measurement error is smaller than the fixed value.

4. A method as claimed in claim 3, wherein the second step includes steps of:
- condensing the first reflected light and focusing it to form a light spot on a two-sectional light receiving surface of a two-sectional photodetector means, and
- calculating the measurement error from a difference between outputs of the two sections of two-sectional light receiving surface.

5. An apparatus for measuring a height of a surface of an object having a non-uniform reflectivity, said apparatus comprising:
- a measuring board for mounting the object,
- floodlight optical means for projecting a laser beam of a given diameter vertically to the surface of the object,
- first light condensing means for condensing a first reflected light of the laser beam vertically reflected from the surface so that the first reflected light is focused to form a first light spot,
- first photodetector means disposed at a position on which the first light spot is focused for detecting a first deviation of an intensity centroid of the first light spot due to the non-uniform reflectivity of the surface from a position at the center of the first light spot,
- second light condensing means for condensing a second reflected light of the laser beam reflected from the surface in a direction which is different from the vertical direction so that the second reflected light is focused to form a second light spot,
- second photodetection means disposed at a position on which the second light spot is focused for detecting a second deviation of a position of the intensity centroid of the second light spot from predetermined reference position corresponding to a reference height of the surface,
- height arithmetic means for calculating a measured value of a surface height of the object in according with the triangulation method from the second deviation detected by the second photodetection means,
- measurement error arithmetic means for calculating a measurement error of the surface height accordance with the triangulation method from the first deviation detected by the first photodetection means, and
- correcting means for correcting the measured value by compensating measured value for the measurement error.

6. An apparatus for measuring a height of a surface of an object having a non-uniform reflectivity, said apparatus comprising;
- a measuring board for mounting the object,
- floodlight optical means for projecting a laser beam of a given diameter vertically to the surface of the object,
- first light condensing means for condensing a first reflected light of the laser beam vertically reflected from the surface so that the first reflected light is focused to form a first light spot,
- first photodetector means with a two-sectional light receiving surface mounted at a position on which the first light spot is focused for producing a difference between outputs of the two sections of the two-sectional light receiving surface,
- second light condensing means for condensing a second reflected light of the laser beam reflected from the surface in a direction which is different from the vertical direction so that the second reflected light is focused to form a second light spot,
- second photodetection means disposed at a position on which the second light spot is focused for detecting a deviation of a position of the intensity centroid of the second light spot from a predetermined reference position corresponding to a reference height of the surface,
- height arithmetic means for calculating a measured value of a surface height of the object in according with the triangulation method from the deviation detected by the second photodetection means,
- comparing means for comparing the difference produced by the first photodetector means with a predetermined fixed value, and
- output means for outputting the measured value calculated by the height arithmetic means only when the difference is smaller than the fixed value.

* * * * *